US008139602B2

(12) United States Patent
Meier (10) Patent No.: US 8,139,602 B2
(45) Date of Patent: Mar. 20, 2012

(54) SYSTEM, METHOD AND DEVICE FOR HIGH BIT RATE DATA COMMUNICATION OVER TWISTED PAIR CABLES

(75) Inventor: Rolf Meier, Carp (CA)

(73) Assignee: Rockstar Bidco, LP, New York, NY (US)

( * ) Notice: Subject to any disclaimer, the term of this patent is extended or adjusted under 35 U.S.C. 154(b) by 2195 days.

(21) Appl. No.: 10/900,369

(22) Filed: Jul. 28, 2004

(65) Prior Publication Data

US 2006/0023756 A1 Feb. 2, 2006

(51) Int. Cl.
*H04L 12/66* (2006.01)

(52) U.S. Cl. .................................. 370/463; 370/537

(58) Field of Classification Search .............. 370/252, 370/535, 201, 543, 466, 276, 432, 274, 395.1, 370/537; 375/222, 354, 346, 219; 713/201
See application file for complete search history.

(56) References Cited

U.S. PATENT DOCUMENTS

| | | | | |
|---|---|---|---|---|
| 5,872,809 | A * | 2/1999 | Batruni | 375/219 |
| 6,229,818 | B1 * | 5/2001 | Bell | 370/466 |
| 6,868,072 | B1 * | 3/2005 | Lin et al. | 370/276 |
| 7,133,441 | B1 * | 11/2006 | Barlev et al. | 375/222 |
| 7,154,845 | B1 * | 12/2006 | Barrass et al. | 370/201 |
| 2002/0159462 | A1 * | 10/2002 | Demaria et al. | 370/395.1 |
| 2003/0107999 | A1 * | 6/2003 | Peleg et al. | 370/252 |
| 2004/0146072 | A1 * | 7/2004 | Farmwald | 370/537 |
| 2005/0025266 | A1 * | 2/2005 | Chan | 375/346 |
| 2005/0132230 | A1 * | 6/2005 | Miclea et al. | 713/201 |
| 2005/0141539 | A1 * | 6/2005 | Hamilton et al. | 370/432 |
| 2005/0213648 | A1 * | 9/2005 | Chow | 375/222 |
| 2005/0281268 | A1 * | 12/2005 | Akers et al. | 370/395.1 |
| 2006/0050820 | A1 * | 3/2006 | Kawada et al. | 375/354 |

* cited by examiner

*Primary Examiner* — Kwang B Yao
*Assistant Examiner* — Syed M Bokhari
(74) *Attorney, Agent, or Firm* — Withrow & Terranova, PLLC (57) ABSTRACT

The invention provides for a system, method, and device for using the existing copper loop plant of twisted pair wiring for data communication by using a plurality of pairs in a cable bundle of twisted pair for the downstream data direction simultaneously, as if the plurality of twisted pair in the cable bundle were a broadcast medium. Between an individual subscriber's access pair and the cable bundle, an aggregation device is used to combine all received signals from the plurality of twisted pairs in the cable bundle and to make the entire downstream bandwidth of the plurality of pairs available to the subscriber.

21 Claims, 4 Drawing Sheets

SYSTEM, METHOD AND DEVICE FOR HIGH BIT RATE DATA COMMUNICATION OVER TWISTED PAIR CABLES

FIELD OF THE INVENTION

The invention relates to data communication and more particularly to high bit rate data communication over twisted pair cables.

BACKGROUND OF THE INVENTION

Several communication technologies have been previously used to provide high data rare wired communication with each having various associated advantages and disadvantages.

One technology, DSL (Digital Subscriber Loop) encompasses various standards such as ADSL (Asymmetric DSL) and VDSL (Very high bit rate DSL) in which a single pair of wires is used from the cable plant for each communication channel. Methods exist for combining a small number of pairs for subscriber premises, however, for each subscriber serviced, a dedicated pair is used.

Another technology, SHDSL (Symmetrical High-speed DSL) and technologies similar to it, employ multiple pairs of wires for each subscriber in order to increase the bandwidth available per subscriber. Each pair taken from the cable to a given subscriber is not available to subsequent subscribers further downstream on the distribution cable.

Hybrid Fiber Coax (HFC), another technology uses a shared coax cable for data communication between a plant and multiple subscribers. Consequently, each subscriber has access to a large amount of shared bandwidth. The shared coax cable is expensive and is not available to many subscribers who live in areas where it has not been economical to install. Shared coax cable systems are generally owned by a single communications company in a particular area, while a competing provider might not have a coax cable infrastructure. Additionally, with a shared coax infrastructure, upstream traffic from individual subscribers is present at each subscriber interface, resulting in a potential security issue. By contrast, a twisted pair infrastructure is available to almost every home and business in developed parts of the world.

SUMMARY OF THE INVENTION

The invention provides for a system, method, and device for using the existing copper loop plant of twisted pair wiring for data communication by using a cable bundle containing a plurality of twisted pairs for a downstream data direction simultaneously, as if the plurality of twisted pairs in the cable bundle were a broadcast medium. Between an individual subscriber's access pair and the cable bundle, an aggregation device is used to combine all the data from the plurality of twisted pairs in the cable bundle and to make the entire downstream bandwidth of the plurality of twisted pairs available to the subscriber.

In one aspect, the invention provides an aggregation device adapted to combine downstream signals logically separated on multiple twisted pairs into a single aggregate signal so as to increase communication bandwidth experienced by the subscriber receiver. In this manner, many megabits of data can be made available to each subscriber in a shared fashion. For example, if each subscriber receiver twisted pair has a capacity of 10 Mb/s in the downstream direction, and the cable bundle consists of 25 pairs, then each subscriber will have available an instantaneous data rate of 10×25=250 Mb/s on a shared basis. Upstream data is transmitted via the aggregation device on a single channel of the plurality of twisted pairs. The upstream and downstream signals consist of data communications signals. Plain Old Telephone Service (POTS) signals also traverse the aggregation device from the transmitter to the subscriber receiver and vice versa along the path of the upstream signals.

In this manner, many megabits of data can be made available to each subscriber in a shared fashion. For example, if each subscriber receiver twisted pair has a capacity of 10 Mb/s in the downstream direction, and the cable bundle consists of 25 pairs, then each subscriber will have available an instantaneous data rate of 10×25=250 Mb/s on a shared basis. The upstream and downstream signals consist of data communications signals. Plain Old Telephone Service (POTS) signals also traverse the aggregation device from the transmitter to the subscriber receiver and vice versa.

In another aspect, the invention provides a communication system, which has at the head-end a transmitter for multiplexing a data stream onto the cable bundle containing multiple twisted pairs and an aggregation device for each of a number of subscriber receivers. Each aggregation device receives the signals carried downstream on each of the twisted pairs and recombines the multiple signals into an aggregate signal. The aggregation device also receives an upstream signal transmitted from a respective subscriber and passes that signal on to only a respective one of the twisted pairs.

Advantageously, embodiments implemented in accordance with the invention have much larger total bandwidth than of prior systems, and will allow statistical multiplexing of data. Since a large number of users are using a large amount of bursty-type bandwidth, the peak bandwidth requirement can be averaged out and this the performance increased for everyone.

Advantageously, embodiments or a system according to the invention generally require no additional copper plant infrastructure to be installed since the system can work with existing loop plant.

Advantageously, for embodiments of a system according to the invention, each broadcast channel needs to be present only once, in contrast to DSL which requires duplication of broadcast channels together with a complex multicast algorithm. Duplication of broadcast channels in DSL results in unnecessary crosstalk generation which serves to further lower DSL capacity.

Advantageously, for embodiments of a system according to the invention, upstream data is physically separated on individual twisted pair and downstream data is logically separated by an appropriate protocol, in contrast to coax.

Advantageously, for embodiments of a system according to the invention, Plain Ordinary Telephone Service (POTS) is supported transparently.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

Figure 1:
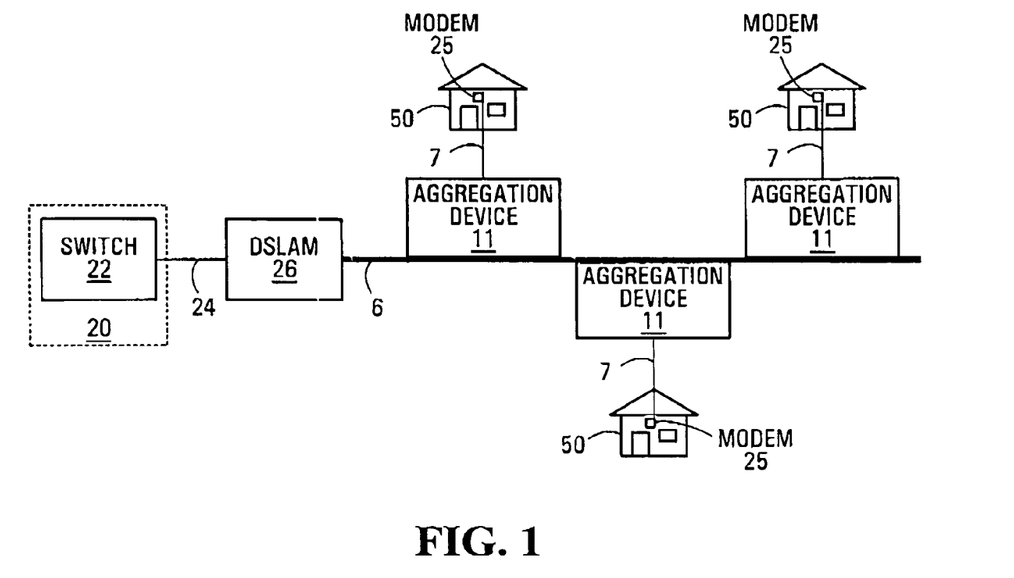
FIG. 1 is a block diagram of a portion of a communications system according to an embodiment of the invention.

Referring to FIG. 1, a communications system according to an embodiment of the invention will now be discussed.

At a central office or head-wind 20, a switch 22 is coupled by a link 24 to a digital subscriber line access multiplexer (DSLAM) 26. The DSLAM 26 is coupled via a distribution cable 6 comprising a bundle of twisted pairs so as to provide voice and data services to a number of receiving destinations identified as subscriber premises 50. For each of the subscriber premises 50, a respective aggregation device 11 is coupled to the subscriber premises 50 by a receiving destination drop line identified as subscriber drop line 7. Each respective aggregation device 11 is coupled to a plurality of the twisted pairs of the distribution cable 6.

In some embodiments provided by the invention the switch 20 is a router. In some embodiments the link 24 is a fiber optic link. In some embodiments each of the subscriber premises 50 has a modem 25 to transmit and receive data. In some embodiments the aggregation device 11 is coupled to all twisted pairs of the distribution cable 6. In other embodiments the aggregation device 11 is coupled to only a desired number of the twisted pairs, which may be less than the total number of the twisted pairs of the distribution cable 6.

Figure 2:
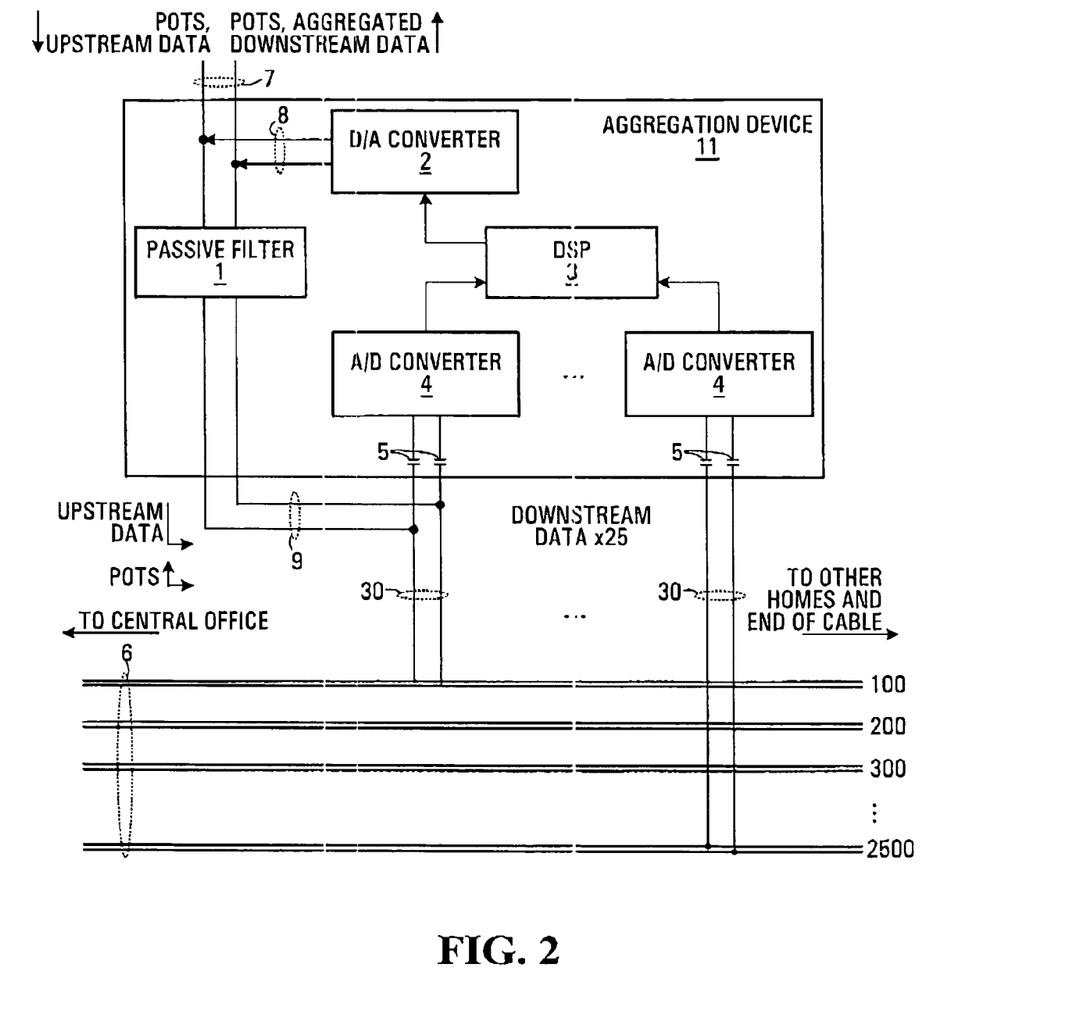
FIG. 2 is a block diagram of an aggregation device coupled to a twisted pair bundle according to an embodiment of the invention.

In some embodiments Plain Old Telephone Service (POTS) signals for each of the subscriber premises 50 is delivered by a singles respective dedicated twisted pair. In FIG. 2, this specific twisted pair is twisted pair 100.

Each aggregation device 11 functions to collect individual downstream data on each twisted pair of the distribution cable 6 and combine them into a single data stream for the shorter subscriber drop line 7 which is coupled to the modem 25 of the subscriber premises 50. The aggregation device 11 also separates the upstream data and POTS signals, if the POTS signals occur, on a respective channel from the downstream data as the downstream data is being recombined. Downstream data is defined as data transmitted from the distribution cable 6 in a direction of the subscriber premises 50 and upstream data is defined as data transmitted from the subscriber premises 50 in a direction of the distribution cable 6.

Referring also to FIG. 2, an implementation of an aggregation device 11 according to an embodiment of the invention will now be discussed.

In a typical distribution plant, 25 (or 50, 100 etc.) twisted pairs of copper wire of the distribution cable 6 run past each subscriber premises 50 in a distribution serving area. As outlined above each of the subscriber premises 50 is connected to one twisted pair 100 for traditional POTS voice service. The twisted pair 100 is coupled to upstream segment 9 which along with the aggregation device 11 and the subscriber drop line 7, connects the distribution cable 6 with the subscriber premises 50. Preferably the bridge tap (the portion of the twisted pair 100 of the distribution cable 6 which continues past its respective subscriber premises 50 to an end of the distribution cable 6) is connected to the aggregation device 11 at each of the subsequent subscriber premises 50. Therefore, the aggregation devices 11 of the other subscriber premises 50 in the distribution area have the ability to receive data on all twisted pairs 100, 200, . . . 2500 to which they are coupled. Each of the twisted pairs are terminated at the end of the distribution cable 6 with an appropriate termination load. In a particular embodiment an appropriate termination load is approximately 100Ω. More generally, any appropriate value of termination load can be used at the end of the distribution cable 6 for each respective twisted pair.

Referring once again to FIG. 2, twisted pair 100 carries upstream data for one of the subscriber premises 50, the aggregation device 11 of which is shown in detail. Twisted pair 200 carries upstream data of a next one of the subscriber premises 50, twisted pair 300 is used for upstream data of a further one of the subscriber premises 50, and so on. In some embodiments POTS signals for individual subscriber premises 50 are carried on the same respective twisted pair used for upstream data for that particular subscriber premises 50. Downstream data is carried on each of the twisted pairs, however the downstream data on one twisted pair is not solely designated for only a single subscriber premises 50. The downstream data from all twisted pairs 100, 200, . . . 2500 is collected together and made available to each subscriber premises 50 by means of the illustrated embodiment.

The aggregation device 11 has an analog-to-digital (A/D) converter 4 for each twisted pair 100, 200, . . . 2500 in the distribution cable 6. Each twisted pair is coupled to a corresponding twisted pair segment 30. Each wire of the twisted pair segment 30 is coupled to a DC blocking capacitor 5. Each pair of capacitors 5 is further coupled to a corresponding A/D converter 4.

In some embodiments the A/D converters 4 have high input impedance that is matched by the termination load at the end of the distribution cable 6.

In a particular embodiment of the invention the capacitors 5 have a capacitance of 0.1 µf and a breakdown voltage of 400 volts.

As shown in FIG. 2, one end of the upstream segment 9 is coupled to the twisted pair segment 30 at a location between the capacitors 5 and the twisted pair 100 of the distribution cable 6. In some embodiments the upstream segment 9 is connected directly to the respective twisted pair. The other end of the upstream segment 9 is coupled to a passive filter 1, which in turn is coupled to the subscriber drop line 7.

Each A/D converter 4 is coupled to a Digital Signal Processor (DSP) 3. The output of the DSP 3 is coupled to an input of a digital-to-analog (D/A) converter 2. The output 8 of the D/A converter 2 is coupled to the subscriber drop line 7.

In some embodiments the DSP 3 is implemented as a standard DSP chip. In other embodiments the DSP 3 is implemented by other standard hardware implementation methods for example, an application specific integrated circuit (ASIC).

In FIG. 2, the various components of the aggregation device 11 are shown to be separate functional blocks. In some embodiments these components may be implemented in a larger or smaller number of functional blocks, for example the D/A converters 4, the DSP 3 and the A/D converter 2 may be implemented within one ASIC.

The passive filter 1 of FIG. 2 may not be a passive filter in all embodiments. Generally, a filter could be any active or passive filter, digital or analog filter, which can provide the desired filter response.

Before discussing the functioning of the embodiment of the invention depicted in FIG. 2, the specific power spectral density of signals present at various locations in the embodiment shown in FIG. 3, and an example passband of the passive filter 1 shown in FIG. 4, will be discussed.

Figure 3:
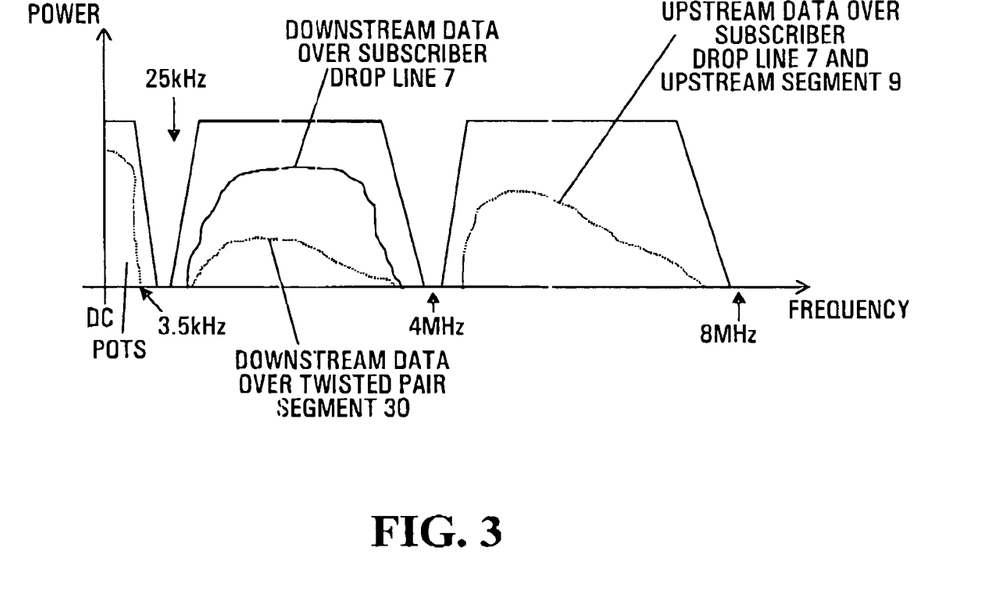
FIG. 3 is an example power spectrum of upstream and downstream signal powers at various locations within a communications system according to an embodiment of the invention.

Referring to FIG. 3, an example spectrum of the twisted pair 100 is considered. The POTS spectrum occurs from DC to 3.5 kHz. The downstream data spectrum occupies 25 kHz to 4 MHz. The upstream data spectrum occupies 4 MHz to 8 MHz. These frequencies are not intended to limit the applicability of implementation but serve merely to illustrate the principle of operation of the passive filter 1. Implementations of embodiments of the invention similar to that depicted in the figures may be adapted to other spectral divisions. For example, to conform to VDSL standards the spectral divisions may be 138 kHz to 3.75 MHz for the downstream data spectrum and 3.75 MHz to 5.2 MHz for the upstream data spectrum.

Also shown are example spectral power distributions for the upstream data which is transmitted over the subscriber drop line 7 and upstream segment 9, the downstream data carried on single twisted pair 100 traversing the twisted pair segment 30, and the aggregate downstream data comprising the data from multiple twisted pairs 100, 200, . . . 2500 traversing the subscriber drop line 7. As will be discussed below it should be noted that the relative power of the downstream data traversing a single twisted pair, for example the downstream data traversing the twisted pair segment 30, is less than the power of the aggregate downstream data which emerges from the aggregation device 11 and is transmitted over the subscriber drop line 7.

Figure 4:
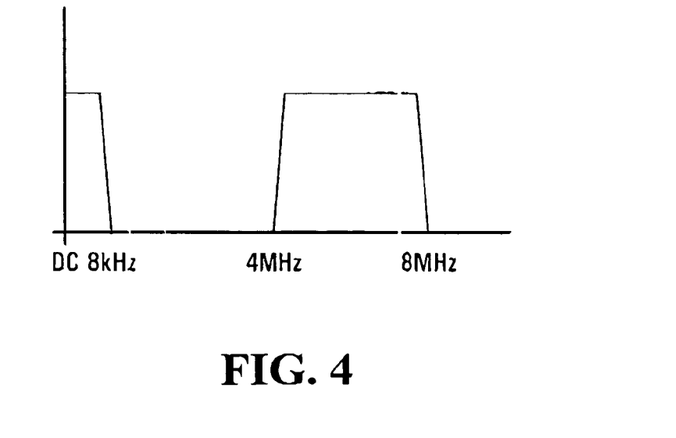
FIG. 4 is a frequency profile of an example passband filter for use in an embodiment of the invention.

FIG. 4 depicts an example passband characteristic of the passive filter 1. As can be seen in the figure passbands are from DC to 8 kHz and from 4 MHz to 8 MHz, allowing both the POTS signal spectrum and upstream signal spectrum to pass through, while filtering out downstream signal spectrum. As mentioned above ocher embodiments have alternative passband characteristics, for example for the described VSDL spectrum.

Referring once again to FIG. 2, the downstream data spectrum from all twisted pairs 100, 200, . . . 2500 in the distribution cable 6 is captured by the aggregation device 11 with use of the capacitors 5. The capacitors 5 act to block the DC component of the signal arriving on the twisted pairs of the distribution cable 6.

The A/D converters 4 convert the analog data spectrum into digital format by sampling the received signal so that downstream data on each respective twisted pair can be demodulated by the DSP 3. The DSP 3 performs a number of functions with use of the digital output of the A/D converters 4. The DSP 3 performs additional filtering to attenuate energy outside the downstream data spectrum, for example POTS signals and upstream data signals received by the A/D converters 4. The DSP 3 also performs demodulation of individual downstream data signals to recover a data bit stream from each twisted pair 100, 200, . . . 2500 coupled to the aggregation device 11, construction of an aggregate data bit stream which includes the individual downstream data signals from all of the twisted pairs 100, 200, . . . 2500 coupled to the aggregation device 11, and modulation of the higher-speed data bit stream.

The modulated signal of the higher-speed data bit stream is a digitally modulated signal. The aggregate data bit stream is converted to an analog format signal for transmission by the D/A converter 2. The higher-speed data signal is also converted to a balanced signal before traversing the output 8 of the D/A converter 2, making it suitable for combining with upstream data, and if so occurring POTS; signals, on subscriber drop line 7. The power spectral density of this aggregate signal is shown as "DOWNSTREAM DATA OVER SUBSCRIBER DROP LINE 7" in FIG. 3.

The passive filter 1 of the aggregation device 11 shown in FIG. 2 performs the function of preventing the downstream data arriving on twisted pair 100 of the distribution cable 6 and traversing twisted pair segment 30 and upstream segment 9 from interfering with the higher-speed data present on subscriber drop line 7 and vice versa. As discussed above with respect to FIG. 4, the passive filter 1 allows POTS signals and upstream data signals to pass while filtering out the downstream data signals.

As a result of the configuration of the embodiment in FIG. 2, upstream data signals are passed in one direction from the subscriber premises 50 over it path comprising the subscriber drop line 7, the passive filter 1, upstream segment 9, twisted pair segment 30 to twisted pair 100 of the distribution cable 6. The configuration of the embodiment also allows for POTS signal to be passed to and from the subscriber premises 50 over the same path, which is from the subscriber premises to the distribution cable 6. The downstream data of all of the twisted pairs 100, 200, . . . 2500 is isolated from upstream and POTS signals and digitally processed in the aggregation device 11 when being recombined into the aggregate downstream signal. The aggregation device 11 outputs an aggregated data stream to the subscriber premises 50 over the subscriber drop line 7.

There is no concern about a lack of transmission security regarding the upstream data from one subscriber premises 50 being transmitted to other subscriber premises 50 because DSP 3 filters out any upstream signal energy from each respective twisted pair 100, 200, . . . 2500 coupled to the aggregation device 11.

Other benefits and advantages from the aggregation device 11 used in a system such as that depicted in FIG. 1 will be described below.

Figure 5:
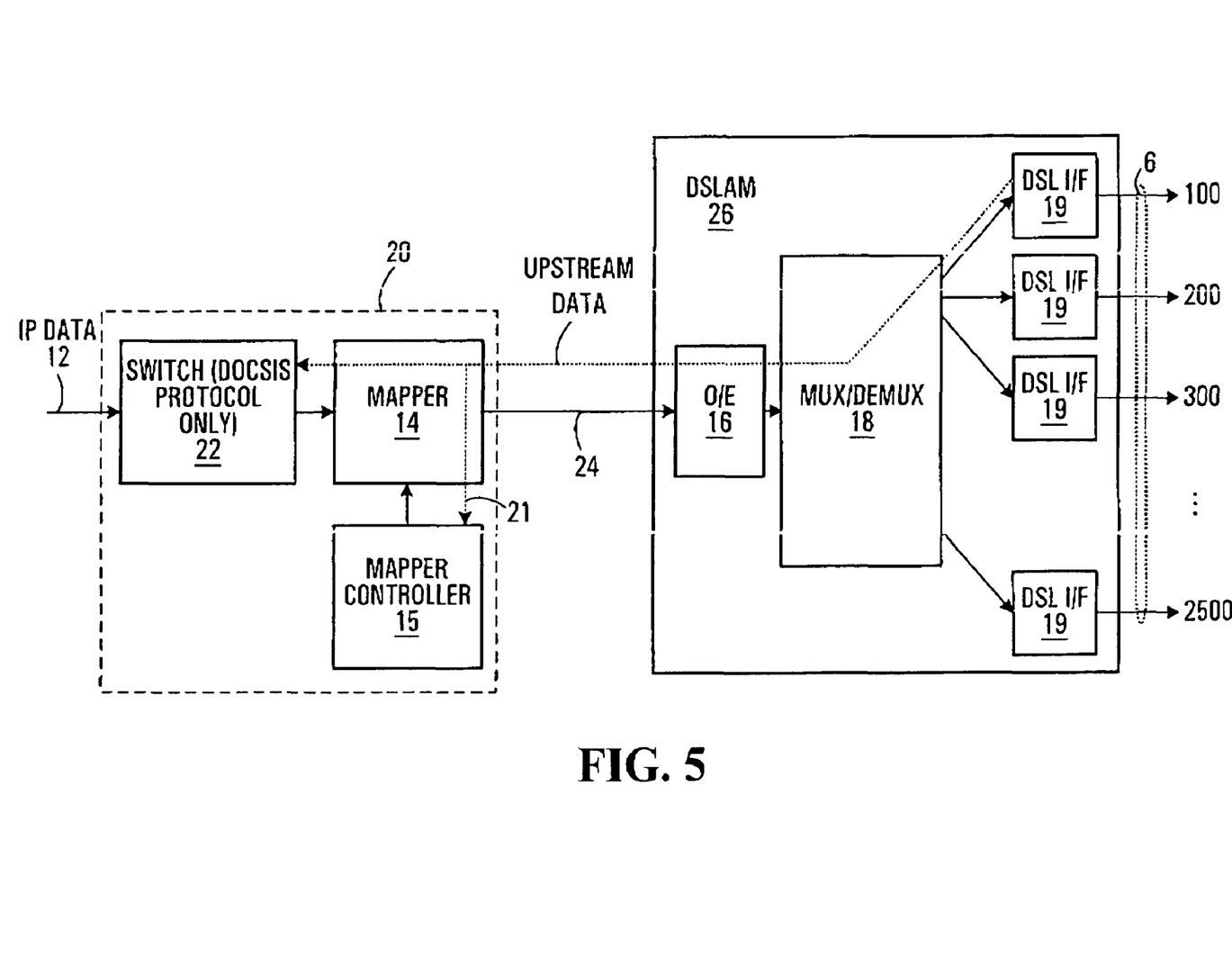
FIG. 5 is a block diagram of an example transmitter configuration of an embodiment of the invention for a central office location.

Referring to FIG. 5, the central office or head-end 20 will now be described.

At the central office or head-end 20, there exists a means of associating information with data to be transmitted to the subscriber premises 50 so that the data is distributed, or striped, over a number of physical lines by a remote digital service line access multiplexer (DSLAM) 26. This is done in such a way as to ensure that the copper loop plant is used to its fullest capacity.

FIG. 5 illustrates a means of striping data over multiple physical twisted pair wires 100, 200, . . . 2500. The implementation depicted serves only as an example of how data striping may be achieved, and other techniques may be adapted to work equally well.

In FIG. 5, a link 12 for supplying data is coupled to the switch 22. The switch 22 is coupled to a mapper 14. Also coupled to the mapper 14 is a mapper controller 15. A further link 24 couples the mapper 14 to the DSLAM 26. Within the DSLAM 26 an optical-electrical converter (O/E) 16 is coupled to link 24. The O/E 16 is coupled to a multiplexer/demultiplexer 18 (Mux/Demux). The Mux/Demux 18 has multiple outputs. Each output is coupled to a respective DSL interface 19. Each DSL interface 19 is coupled to a corresponding twisted pair 100, 200, . . . 2500, which together form the distribution cable 6.

In embodiments where link 24 is not a fiber optic link, O/E 16 in the DSLAM 26 is not required.

In a particular embodiment, a protocol known as Data Over Cable Service Interface Specification (DOCSIS) is used as a means of providing a secure connection for incoming IP data to a modem 25 at a respective subscriber premises 50.

The IP data, is mapped (striped) across various DSL interfaces 19 based upon a mapping set by the mapper 14. The transport link 24 between the mapper 14 and the DSLAM 26 in a particular embodiment is gigabit Ethernet.

The O/E 16 resides in the DSLAM 26 to provide an interface to the Mux/Demux 18. The purpose of the Mux/Demux 18 is to implement the mapping function as defined by the mapper 14, for example using media access control (MAC) addresses. When a downstream data packet has been mapped accordingly, the downstream data packer is sent to the appropriate one of the plurality of DSL interfaces 19 and from there over a corresponding twisted pair in distribution cable 6. The downstream data packets are collected from the various twisted pairs 100, 200, . . . 2500 by the aggregation device 11 as previously described.

In some embodiments, in order to aid in providing a proper mapping, the mapping controller 15 relies on an examination of upstream data from one or more of the twisted pairs 100, 200, . . . 2500. An upstream data path starting at the top-most DSL interface 19 in FIG. 5 to the mapper controller 15 is shown as a broken line. The upstream data gives an indication as to proper arrival of data packets at the modems 25 in respective subscriber premises 5). Using information pertaining to the proper arrival of data packets the mapping controller can modify the mapping function used by the mapper 14. In this way, the downstream data packets are distributed across the various twisted pairs 100, 200, . . . 2500 in manner to make efficient and effective use of the bandwidth capacity of each pair.

In FIG. 5, the mapper 14 and mapper controller 15 are shown to be separate functional blocks. In some embodiments these components may be implemented in a larger or smaller number of functional blocks, for mapper 14 and mapper controller 15 may be implemented within one ASIC.

The mapper 14 and mapper controller 15 can be implemented using conventional hardware technologies for example, a DSP chip operating programmable code for performing the mapping functions or an ASIC.

Typically, downstream data over a twisted pair from the central office or head-end 20 is greatly attenuated by the time of its arrival at the subscriber premises 50 due to the long distance of the twisted pair between the DSLAM 26 and the subscriber premises 50. This is illustrated in the example power spectral density of FIG. 3 labelled "DOWNSTREAM DATA OVER TWISTED PAIR SEGMENT 30". However, the aggregate downstream data summed over all 25 twisted pairs is not nearly as attenuated as that: found over a single twisted pair. By summing the data from all twisted pairs 100, 200, . . . 2500 the power spectral density of subscriber drop line 7 is achieved. The example spectral density of combined data from all twisted pairs 100, 200, . . . 2500 is shown in FIG. 3 and labelled "DOWNSTREAM DATA OVER SUBSCRIBER DROP LINE 7". The distance between the aggregation device 11 and a respective subscriber premises 50 is much shorter that the distance between the central office or head-end 20 and the aggregation device 11 of the respective subscriber premises. Therefore, the aggregate data signal from all twisted pairs travelling between the aggregation device 11 and a respective subscriber premises 50 is not attenuated as significantly as the downstream data signals travelling on separate twisted pairs in the distribution cable 6.

In addition to the aggregate downstream data signal being less attenuated, the shared use of all twisted pairs 100, 200, . . . 2500 for downstream data transmission can lead to increased bandwidth simply because not all pairs in the distribution cable 6 are typically used, there often being a number of available spare twisted wires. For example, even though 25 twisted pairs may be present in a distribution cable 6, the distribution cable 6 may run past less than 25 subscriber premises 50, and even upon considering that some subscriber premises have multiple lines, typically there are still spare twisted pairs in the distribution cable 6.

Efficiency of broadcast data is greatly enhanced since broadcast data is visible at each subscriber premises 50 without having to be duplicated on each subscriber's twisted pair as required in systems using dedicated lines. An example of broadcast data is broadcast television.

Another reason that advantages are achieved with embodiments of the present invention is that at any given time many subscribers are totally idle. Thus, the bandwidth of the twisted pairs of those subscribers is made available to all active users. In prior DSL solutions this potential bandwidth is wasted.

Since each subscriber sees a large amount of downstream data, and only a portion of that is intended for a particular subscriber, a means must be used for logically separating the intended data from the total. The DOCSIS protocol described above provides the necessary secure communications for the transfer of data. The physical layer of DOCSIS need not be present anywhere in the distribution network. The DOCSIS protocol is not the only protocol which will work, but is specified so as to illustrate the principle using an existing protocol. Other protocols are possible in different embodiments of the invention.

A protocol used in some embodiments of the invention is Ethernet protocol. The Ethernet protocol also separates the intended information to individual users from an aggregate data stream by making use of MAC addresses.

To provide a system according to embodiments of the invention, generally no additional copper plant infrastructure needs to be installed since the system can work with existing loop plant.

Advantageously, for embodiments of a system according to the invention, bad or unusable twisted pairs have a much reduced impact on the overall downstream capacity available to each subscriber. This is in contrast to DSL where an unlucky subscriber may be solely connected to a bad or unusable pair.

In some embodiments the aggregation device 11 is located at a "curb-side" junction box and the subscriber drop line 7 connects the aggregation device 11 to the modem 25 within the subscriber premises 50. In ocher embodiments the aggregation device 11 may be in physical contact with the subscriber premises 50 and the subscriber drop line 7 connects the aggregation device 11 to the modem 25 within subscriber premises 50.

In some embodiments the subscriber drop line 7 is coax cable or CAT5 twisted pair. In some embodiments a wireless link is used from a location of the aggregation device 11 to the modem 25 within the subscriber premises 50.

In some embodiments the modem 25 within the subscriber premises 50 is a cable modem.

In some embodiments the DSLAM 26 may comprise existing DSL line cards (such as VDSL) or a custom configuration could be developed.

In some embodiments the high speed technology between the aggregation device 11 and the subscriber premises 50 (in particular the modem 25) may be Ethernet, VDSL, QAM, or other applicable technologies.

Numerous modifications and variations of the present invention are possible in light of the above teachings. It is therefore to be understood that within the scope of the appended claims, the invention may be practiced otherwise than as specifically described herein.

I claim:

1. An aggregation device adapted to be coupled to a plurality of twisted pairs, the aggregation device adapted to receive a plurality of downstream signals that originated from a common downstream signal, each of the plurality of downstream signals on a respective twisted pair of the plurality of twisted pairs, the aggregation device comprising:
   a separate channel to receive an upstream signal from the receiving destination and pass the upstream signal to a twisted pair of the plurality of twisted pairs, wherein the twisted pair only receives the upstream signal from the aggregation device and provides a downstream signal for other aggregation devices;
   a filter coupled to a first twisted pair of the plurality of twisted pairs, the filter adapted to filter out a spectrum comprising downstream signals on the first twisted pair;
   a plurality of analog-to-digital (A/D) converters for sampling the respective downstream signals, each A/D converter coupled to a respective twisted pair of the plurality of twisted pairs;
   a digital signal processor (DSP) adapted to receive an output from each of the A/D converters, the DSP adapted to combine respective downstream signals from each A/D converter into an aggregate downstream signal;
   a digital-to-analog (D/A) converter coupled to the DSP, the D/A converter adapted to receive the aggregate downstream signal; and
   a receiving destination drop channel coupled to the D/A converter and the filter, the receiving destination drop channel adapted to carry the aggregate downstream signal from the D/A converter to the receiving destination and to carry the upstream signal from the receiving destination to the filter, prior to the upstream signal being passed through the filter to the first twisted pair.

2. An aggregation device according to claim 1, wherein the DSP is further adapted to attenuate spectral energy outside a desired spectral range of the aggregate downstream signal.

3. An aggregation device according to claim 1, wherein the DSP is further adapted to:
   demodulate each of the plurality of downstream signals to recover a signal from each of the plurality of twisted pairs;
   combine the signals from each of the plurality of twisted pairs to form a combined signal; and
   modulate the combined signal to form the aggregate downstream signal.

4. An aggregation device according to claim 1, wherein the receiving destination drop channel is physically implemented by one of a group consisting of CAT2 twisted pair, co-axial cable, and a wireless connection.

5. An aggregation device according to claim 1, wherein POTS signals transmitted to and received from the receiving destination are supported on the separate channel used for upstream signals.

6. A communication system comprising:
   a transmitter adapted to transmit over a plurality of twisted pairs a plurality of respective downstream signals originating from a common downstream signal to a plurality of receiving destinations; and
   for each receiving destination of the plurality of receiving destinations a respective aggregation device adapted to be coupled to more than one of the plurality of twisted pairs, the respective aggregation device adapted to receive and combine the plurality of respective downstream signals carried on the plurality of twisted pairs into an aggregate downstream signal and to transmit the aggregate downstream signal to the receiving destination, the respective aggregation device further comprising:
   a filter coupled to a first twisted pair of the plurality of twisted pairs, the filter adapted to filter out a spectrum comprising downstream signals on the first twisted pair;
   a plurality of analog-to-digital (A/D) converters for sampling the respective downstream signals, each A/D converter of the plurality of A/D converters coupled to a respective twisted pair of the plurality of twisted pairs;
   means for receiving an output from each of the A/D converters, the means for receiving further comprising means for combining respective downstream signals from each A/D converter into an aggregate downstream signal;
   a digital-to-analog (D/A) converter coupled to the means for receiving, the D/A converter adapted to receive the aggregate downstream signal; and
   a receiving destination drop channel coupled to the D/A converter and the filter, the receiving destination drop channel adapted to carry the aggregate downstream signal from the D/A converter to the receiving destination and to carry an upstream signal from the receiving destination to the filter, prior to the upstream signal being passed through the filter to the first twisted pair;
   a separate channel that is coupled to a twisted pair of the plurality of twisted pairs for carrying the upstream signal from the receiving destination, wherein the twisted pair only receives the upstream signal from the respective aggregation device and provides a downstream signal for other aggregation devices.

7. A communication system according to claim 6, wherein the transmitter includes a Digital Subscriber Line Access Multiplexer (DSLAM).

8. A communication system according to claim 6, wherein the transmitter includes a mapping device and a mapping controller that aid in demultiplexing a common downstream signal into the plurality of respective downstream signals transmitted on the plurality of twisted pairs.

9. A communication system according to claim 8, wherein the mapping controller receives information from upstream signals of the plurality of receiving destinations and uses the information in modifying a mapping function of the mapping device for efficient and effective use of bandwidth capacity of each twisted pair.

10. A communication system according to claim 6, wherein the system further comprises a receiver located at the plurality of receiving destinations, the receiver adapted to be coupled to the respective aggregation device and receive the aggregate downstream signal generated by the respective aggregation device.

11. A communication system according to claim 10, wherein the receiver is a modem.

12. A communication system according to claim 6, wherein the means for receiving further comprises means for attenuating spectral energy outside the desired spectral range of the aggregate downstream signal.

13. A communication system according to claim 6, wherein the means for receiving comprises:
   means for demodulating each respective signal of the plurality of respective downstream signals to recover a signal from each of the plurality of twisted pairs;

means for combining the signals from each of the plurality of twisted pairs to form a combined signal; and means for modulating the combined signal to form the aggregate downstream signal.

14. A communication system according to claim 6, wherein the receiving destination drop channel is physically implemented by one of a group consisting of CAT5 twisted pair, co-axial cable, and a wireless connection.

15. A communication system according to claim 6, wherein the transmitter is adapted to transmit a plurality of POTS signals over said plurality of twisted pairs, each one of the plurality of twisted pairs carrying a POTS signal for a particular receiving destination, and wherein the respective aggregation device is adapted to receive a respective POTS signal corresponding to the particular receiving destination coupled to the aggregation device and to filter out POTS signals corresponding to other subscriber receivers on other twisted pairs of the plurality of twisted pair.

16. A method of communicating over a plurality of twisted pairs, the method comprising:

receiving a plurality of downstream signals transmitted over the plurality of twisted pairs, the plurality of downstream signals originating from a common downstream signal;

sampling the respective downstream signals at a plurality of analog-to-digital (A/D) converters, each A/D converter of the plurality of A/D converters coupled to a respective twisted pair of the plurality of twisted pairs;

receiving an output from each of the A/D converters;

combining respective downstream signals from each A/D converter into an aggregate downstream signal;

receiving the aggregate downstream signal at a digital-to-analog (D/A) converter;

carrying the aggregate downstream signal from the D/A converter to the receiving destination at a receiving destination drop channel coupled to the D/A converter;

carrying, at the receiving destination drop channel, an upstream signal from the receiving destination to a filter coupled to a first twisted pair of the plurality of twisted pairs, where the receiving destination drop channel is coupled to the filter;

filtering out a spectrum comprising downstream signals on a first twisted pair at the filter; and transmitting the upstream signal to the first twisted pair, wherein the first twisted pair only receives the upstream signal from the receiving destination and provides a downstream signal for other receiving destinations.

17. A method according to claim 16, wherein transmitting over the plurality of twisted pairs involves using a mapping device and a mapping controller to aid in demultiplexing the common downstream signal into the plurality of downstream signals transmitted by the plurality of twisted pairs.

18. A method according to claim 16, wherein the step of combining comprises:

demodulating each of the plurality of downstream signals to recover a signal from each of the plurality of twisted pairs;

combining signals from each of the plurality of twisted pairs to form a combined signal; and modulating the combined signal to form the aggregate downstream signal.

19. A method according to claim 16, wherein an appropriate protocol is used as a means of providing a secure connection for signals transferred between a transmitter for transmitting, over the plurality of twisted pairs, the plurality of downstream signals, and the receiving destination.

20. A method according to claim 19, wherein the protocol is Data Over Cable Service Interface Specification (DOCSIS).

21. A method according to claim 16, wherein POTS signals transmitted and received between a transmitter end and a respective receiving destination are transmitted on the twisted pair of the plurality of twisted pairs used for upstream signal transmission.

\* \* \* \* \*